United States Patent
McMinn

[11] 3,722,184
[45] Mar. 27, 1973

[54] APPARATUS FOR SEPARATING OIL AND GAS FROM A FOAMING CRUDE OIL STREAM

[75] Inventor: Robert E. McMinn, Oklahoma City, Okla.

[73] Assignee: Black, Sivalls & Bryson, Inc., Oklahoma City, Okla.

[22] Filed: May 17, 1971

[21] Appl. No.: 143,998

[52] U.S. Cl. ................55/174, 55/178, 252/361, 196/155, 208/184
[51] Int. Cl. ....................................B01d 19/00
[58] Field of Search ...252/361; 196/155; 55/178, 87, 55/171–177; 203/20; 202/264; 208/184

[56] References Cited

UNITED STATES PATENTS

| | | | |
|---|---|---|---|
| 3,212,232 | 10/1965 | McMinn | 55/178 X |
| 3,385,031 | 5/1968 | McMinn | 55/174 X |
| 3,212,234 | 10/1965 | McMinn | 55/177 |
| 3,212,238 | 10/1965 | Welch et al. | 55/174 X |
| 3,246,451 | 4/1966 | Glasgow | 55/174 X |
| 3,094,574 | 6/1963 | Glasgow et al. | 261/23 |
| 2,735,506 | 2/1956 | Glasgow | 55/175 X |
| 2,610,697 | 9/1952 | Lovelady et al. | 55/174 X |

*Primary Examiner*—Norman Yudkoff
*Assistant Examiner*—David Edwards
*Attorney*—Dunlap, Laney, Hessin and Dougherty

[57] ABSTRACT

The present invention relates to improved apparatus for separating oil and gas from a foaming crude oil stream of the type which includes an elongate substantially horizontal vessel having a crude oil stream inlet at one end and oil and gas outlets at points removed from the inlet. By the present invention a coalescing section comprised of a plurality of smooth cylindrical plates positioned longitudinally and concentrically to provide annular flow passages therebetween is disposed within said vessel across the interior thereof and adjacent to the crude oil stream inlet so that gas, oil and foam from the crude oil stream pass through the annular flow passages and oil carried with the gas is coalesced and agglomerated on said plates and removed from the gas. A plurality of foam breaking pads are disposed in the vessel positioned in spaced relationship across the interior thereof on the side of the coalescing section away from the crude oil stream inlet, each of the foam breaking pads including knitted mesh having a texture to distort and break oil foam thereby releasing the gas held in the foam. An oil outlet from the vessel is provided positioned on the side of the last of the foam breaking pads away from the crude oil stream inlet, and a closed compartment is disposed within the vessel at the end thereof away from the crude oil stream inlet. A passageway is provided communicating the top portion of the vessel with the closed compartment so that gas separated from the crude oil stream and gas released from foam in the vessel is passed into the closed compartment. Gas and oil outlets from the closed compartment are provided, and a mist extractor pad is positioned across the closed compartment between the passageway and the gas outlet so that oil mist entrained in the gas passing through the compartment is removed therefrom.

8 Claims, 3 Drawing Figures

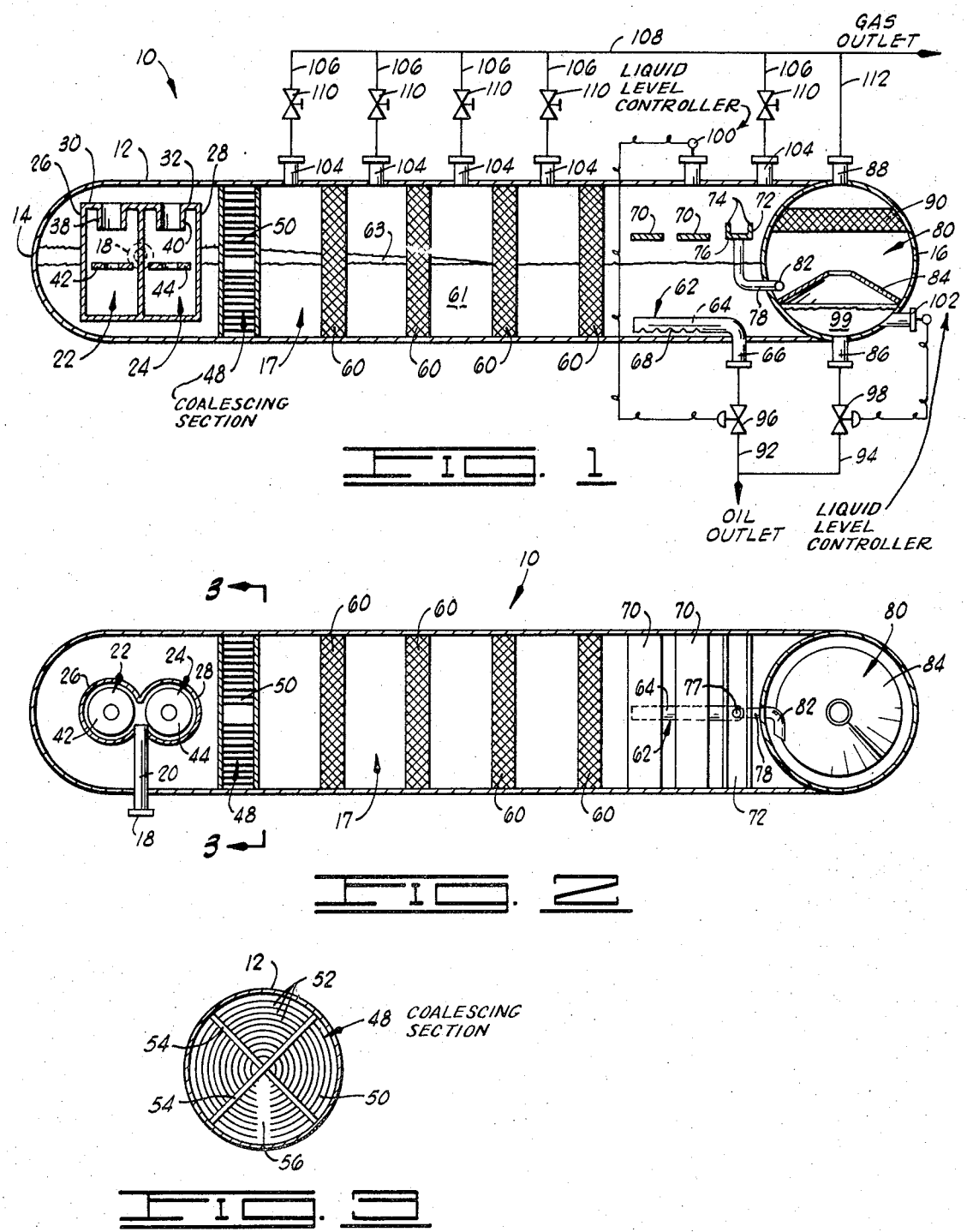

APPARATUS FOR SEPARATING OIL AND GAS FROM A FOAMING CRUDE OIL STREAM

BACKGROUND OF THE INVENTION

1. Field of the Invention

The present invention relates to improved apparatus for separating oil and gas from a foaming crude oil stream, and more particularly, but not by way of limitation, to separator apparatus for separating oil and gas from a foaming crude oil stream of the type including an elongate substantially horizontal vessel having a crude oil stream inlet at one end and oil and gas outlets at points removed from the inlet.

2. Description of the Prior Art

Many various types of apparatus have been developed and used for separating oil and gas from a crude oil stream. Foaming crude oil streams are produced from wells which contain impurities causing the oil and gas mixture to combine in the form of gas bubbles or foam. Commonly, excessive foaming occurs in the crude oil stream produced from such wells as it is passed through well head equipment, particularly the well head choke. As the crude oil and gas produced from the well pass through the choke, the gas is intimately mixed with the oil bringing about the formation of foam.

The most common method of separating oil and gas produced from a well is to pass the oil and gas mixture into a vessel having a sufficient volume and retention time to allow the heavier oil to separate from the gas by gravity. That is, the oil accumulates and is withdrawn from the bottom portion of the vessel with the separated gas being withdrawn from the top portion of the vessel. When such separation apparatus is utilized for separating oil and gas from a foaming crude oil mixture, inadequate separation of the gas from the oil is commonly encountered. That is, a quantity of the oil is discharged with the gas and a quantity of the gas is discharged with the oil in the form of foam or bubbles. This is due to the fact that foam is lighter than oil and requires a very large separator volume and retention time in order for adequate separation by gravity to be achieved. While separator apparatus having sufficient volume and retention time to achieve adequate separation of foaming oil and gas have been used successfully, such apparatus are very expensive to manufacture and install due to the large size thereof.

Recently, separation apparatus for separating oil and gas from foaming crude oil streams have been developed and used which include special internal devices, such as baffles and foam breaking pads, for promoting the breaking of foam and separation of the oil and gas produced. While these apparatus are smaller in overall size as compared to separation apparatus not including internal separation and foam breaking devices, they are still relatively expensive to manufacture and install.

By the present invention, an improved apparatus for separating oil and gas from a foaming crude oil stream is provided of the type which includes internal devices for breaking oil foam and promoting separation of the resulting oil and gas which is more economical than heretofore used apparatus on a barrel of foaming crude oil capacity per dollar of investment basis.

SUMMARY OF THE INVENTION

The present invention relates to improved apparatus for separating oil and gas from a foaming crude oil stream of the type including an elongate substantially horizontal vessel having a crude oil stream inlet at one end and oil and gas outlets at points removed from the inlet. By the present invention, a coalescing section comprised of a plurality of smooth cylindrical plates positioned longitudinally and concentrically to provide annular flow passages therebetween is disposed within said vessel across the interior thereof and adjacent to the crude oil stream inlet so that gas, oil and foam from the crude oil stream pass through the annular passages and oil carried with the gas is coalesced and agglomerated on the plates and removed therefrom. A plurality of foam breaking pads are disposed in the vessel positioned in spaced relationship across the interior thereof on the side of the coalescing section away from the crude oil stream inlet, each of the foam breaking pads including knitted mesh having a texture to distort and break oil foam thereby releasing gas held in the foam, and an oil outlet from the vessel positioned on the side of the last of the foam breaking pads away from the crude oil stream inlet is provided. A closed compartment is disposed within the vessel at the end thereof away from the crude oil stream inlet, and a passageway communicating the top portion of the vessel with the closed compartment is provided so that gas separated from the oil and foam and gas released from foam in the vessel is passed into the closed compartment. Gas and oil outlets from the closed compartment are provided, and a mist extractor pad is positioned across the closed compartment between the passageway and the gas outlet so that oil mist entrained in the gas passing through the compartment is removed therefrom.

It is, therefore, a general object of the present invention to provide an improved apparatus for separating oil and gas from a foaming crude oil stream.

A further object of the present invention is the provision of improved apparatus for separating oil and gas from a foaming crude oil stream which has a higher crude oil stream handling capacity than comparable apparatus used heretofore.

A further object of the present invention is the provision of improved apparatus for separating oil and gas from a crude oil stream wherein the capacity of the apparatus in barrels of foaming crude oil handled per dollar of investment is higher than comparable prior art apparatus.

Other objects, features and advantages of the present invention will be apparent to those skilled in the art from the following detailed description of presently preferred embodiments of the invention given for the purpose of disclosure when taken in conjunction with the accompanying drawings.

BRIEF DESCRIPTION OF THE DRAWINGS

FIG. 1 is a side elevational view of the apparatus of the present invention taken in section and shown partially in diagrammatic form, FIG. 2 is a top view of the apparatus of FIG. 1 taken in section, and FIG. 3 is a sectional view taken along line 3—3 of FIG. 2.

DESCRIPTION OF THE PREFERRED EMBODIMENTS

Referring to the drawings, and particularly to FIGS. 1 and 2, the apparatus of the present invention is illustrated and generally designated by the numeral 10. The apparatus 10 basically comprises an elongate substantially horizontal vessel 12 closed at both the forward end 14 and the rearward end 16 thereof. A foaming crude oil inlet connection 18 is provided into a first compartment 17 contained within the vessel 12. The inlet connection 18 is connected by a conduit 20 to a pair of conventional cyclone separators 22 and 24. The separators 22 and 24 are identical and include cylindrical walls 26 and 28 respectively, open at the bottom end and partially closed at the top end thereof by annular plates 30 and 32 respectively. Cylindrical baffles 38 and 40 depend from the inner edges of the annular plates 30 and 32 and terminate a short distance above splash plates 42 and 44 which are secured to the inner surface of walls 26 and 28 of the separators 22 and 24. The conduit 20 is connected to adjacent sides of the separators 22 and 24 so that swirling of the crude oil stream takes place within the separators 22 and 24 imparting centrifugal force thereto.

A coalescing section generally designated by the numeral 48 is positioned within the first compartment 17 adjacent to the separators 22 and 24. As best shown in FIG. 3, the coalescing section 48 is comprised of a plurality of circular plates 50. The plates 50 are smooth and are of a full circle configuration, disposed longitudinally and concentrically spaced within the vessel 12 so that annular flow passages 52 are provided between the plates. Proper spacing of the plates 50 is maintained by the use of support members 54 which are suitable bars welded or otherwise secured to the end of each plate and supported within the vessel 12. A drainage channel if formed in the lowermost portion of each plate as represented in FIG. 3 by one continuous vertical channel 56. Material collected on each plate by coalescence passes through the channel into the bottom portion of the compartment 17. The coalescing section 48 is disposed within the compartment 17 in the vessel 12 across the entire interior thereof.

A plurality of foam breaking pads 60 are disposed within the compartment 17 of the vessel 12 on the side of the coalescing section 48 away from the crude oil stream inlet 18. Each of the pads 60 is formed of knitted wire mesh, is circular in shape, and extends across the entire interior of the vessel 12 to prevent oil, foam or gas from bypassing the pads. The pads 60 are spaced apart from each other, and the first of the pads 60 is spaced a distance from the coalescing section 48. The pads 60 are woven such that the mesh or texture thereof is sufficiently close to cause the distortion and breaking of foam bubbles passing therethrough, but not of such a closeness to cause excessive pressure drop of gas flowing therethrough. The pads 60 may be made of the same size of knitted wire and mesh or, the first pad 60 may be of a relatively large mesh with each succeeding pad having an increasingly close mesh or texture.

An oil outlet 62 is positioned in the compartment 17 on the side of the last of the foam breaking pads 60 away from the crude oil stream inlet 18 and is comprised of a horizontally extending elongated pipe 64 connected to an outlet connection 66 disposed through a bottom wall portion of the vessel 12. The horizontal pipe 62 is positioned parallel to the axis of the vessel 12 and includes a plurality of openings 68 in the bottom portion thereof.

Horizontally disposed baffles 70 are positioned within the first compartment 17 on the side of the last of the foam breaking pads 60 away from the crude oil stream inlet 18 in spaced relationship so that gas may freely flow therebetween. A U-shaped horizontally positioned baffle 72 is disposed within the first compartment 17 in a horizontal plane coinciding with the plane of the horizontal baffles 70. The baffle 72 includes a pair of upstanding sides 74 and a bottom 76 which extend across the vessel 12 and are attached to the walls thereof. The bottom 76 of the baffle 72 includes an opening 77 therein, and a conduit 78 is attached to the bottom surface of the baffle 72 around the opening 77 thereof. The conduit 78 extends below the baffle 72 into a second compartment 80 formed within the vessel 12 at the end thereof. The compartment 80 is substantially closed and is of an internal spherical shape. Advantageously, the compartment 80 is formed of a pair of spherically shaped heads which function to close one end of the vessel 12 as well as to form the compartment 80.

As shown best in FIG. 2, the conduit 78 extends through a wall of the spherical compartment 80 and terminates or opens within the compartment 80 horizontally and tangentially to an internal surface thereof. An annular splash plate 84 is positioned within the spherical compartment 80 in the lower portion thereof below the end 82 of the conduit 78. Preferably, the sides of the annular splash plate 84 slope downwardly from the center portion thereof to adjacent the internal walls of the compartment 80. An oil outlet 86 from the compartment 80 is disposed in the bottom portion thereof, and a gas outlet 88 from the compartment 80 is disposed in the top portion thereof. A conventional wire mesh mist extractor pad 90 is positioned horizontally in the upper portion of the compartment 80 between the end 82 of the conduit 78 and the gas outlet 88.

A conduit 92 is connected to the oil outlet 66 from the first compartment 17 and a conduit 94 is connected to the oil outlet 86 from the second compartment 80 and to the conduit 92. Conventional liquid level control valves 96 and 98 are disposed in the conduits 92 and 94 respectively. The control valve 96 is operably connected to a conventional liquid level controller 100 disposed within the rearward end of the compartment 17 on the side of the last pad 60 away from the inlet connection 18 and the control valve 98 is operably connected to a conventional liquid level controller 102 disposed in the bottom portion of the compartment 80 of the vessel 12.

A plurality of gas outlets 104 from the first compartment 17 are provided disposed in the top of the vessel 12. The first of the gas outlets 104 is positioned between the coalescing section 48 and the first foam breaking pad 60. Gas outlets 104 are positioned between each of the foam breaking pads 60, and the last of the gas outlets 104 is positioned on the side of the last of the foam breaking pads 60 away from the gas inlet connection 18. A plurality of conduits 106 are connected to the gas outlets 104 and to a gas outlet header 108. Each of the conduits 106 includes a conventional hand control valve 110 disposed therein for controlling the flow of gas exiting the compartment 17 and passing into the header 108. A conduit 112 is connected to the gas outlet 88 from the compartment 80 and to the gas outlet header 108.

OPERATION

In operation of the apparatus 10, a foaming crude oil stream is conducted from a well to the inlet 18 of the vessel 12. The crude oil stream containing free oil, foam and gas passes into the cyclone separators 22 and 24 disposed within the compartment 17 of the vessel 12 wherein initial separation of the gas from the oil and foam takes place. That is, the crude oil stream is caused to swirl within the separators 22 and 24 imparting centrifugal force thereto. The centrifugal force causes the heavier oil and foam to move to adjacent the inside of the walls 26 and 28 of the separators 22 and 24 with the free gas passing upwardly through the center portion thereof, and into the top portion of the compartment 17. The separated oil and foam passes downwardly by gravity within the separators 22 and 24 into the bottom portion of the compartment 17. As will be understood by those skilled in the art, the level controller 100 and the level control valve 96 function to maintain a body of oil 61 within the lower portion of the compartment 17. The body of oil 61 extends along the entire length of the compartment 17 and the lighter foam accumulates in layer 63 on top of the body of oil 61 in the forward portion of the compartment 17. The presence of the body of oil 61 around the bottom portions of the separators 22 and 24 seals the separators and prevents gas from passing through the open bottom ends thereof. The oil and foam separated in the separators 22 and 24 pass through the bottom portion of the coalescing section 48. That is, the oil and foam passes through the annular openings between the plurality of plates 50 in the bottom portion of the coalescing section 48. The separated gas from the separators 22 and 24 passes along the upper portion of the compartment 17 through the upper annular spaces between the plates 50 of the coalescing section 48. A portion of the foam entering the compartment 17 with the inlet stream as well as entrained oil are carried from the separators 22 and 24 by the separated gas. As the gas passes through the annular openings between the plates 50, portions of the foam break and entrained oil coalesces and agglomerates on the plates 50. The agglomerated oil passes by gravity between the plates 50 into the body of oil 61 in the bottom portion of the compartment 17. Thus, the coalescing section 48 functions to separate foam and entrained oil from the gas passing through the top portion thereof as well as to break some of the foam passing through the bottom portion thereof and to distribute the oil and foam uniformly in the bottom portion of the compartment 17. After passing through the coalescing section 48 the oil and foam move along the bottom portion of the vessel 12 through the plurality of foam breaking pads 60. As previously described, the texture of the pads 60 is such that as the oil and foam pass therethrough the foam bubbles are distorted and caused to break thereby releasing the gas contained therein. As mentioned above, the pads 60 are advantageously formed of increasingly smaller mesh along the length of the compartment 17 which causes the larger foam bubbles to break first with the smaller foam bubbles breaking as the foam passes through the last of the foam pads 60. The gas liberated from the breaking foam passing through the pads 60 passes upwardly into the top portion of the compartment 17. As the gas passes through the top portions of the pads 60 the oil and foam carried therewith agglomerate on the pads and are removed from the gas.

By the time the oil and foam have passed through the last of the foam breaking pads 60 all of the foam has been broken and the body of oil contained in the lower portion of the compartment 17 of the vessel 12 on the side of the last of the foam breaking pads 60 away from the inlet connection 18 is free of foam. Continuous portions of the oil are removed by way of the oil outlet 66 and pipe 64 connected thereto. That is, oil is caused to be removed from the bottom most portion of the body of oil 61 through the apertures 68 of the pipe 64 and is withdrawn from the vessel 12 by way of the conduit 92.

As will be apparent to those skilled in the art, the portion of the gas passing through the compartment 17 of the vessel 12 in the uppermost portion of the compartment 17 is relatively free of entrained oil and foam. Thus, small portions of the gas may be removed by way of the outlets 104 from the compartment 17. The control valves 110 disposed in the conduits 106 are each opened to allow a small portion of the gas flowing through the compartment 17 to be withdrawn and passed into the gas outlet header 108. The valves 110 are adjusted by gradually opening them until a first amount of oil is detected flowing into the header 108. Small sample valves are disposed in the conduits 106 (not shown) for this purpose. The oil detection may be accomplished by holding a white rag or paper over the outlet of the sampling valves and adjusting the valves 110 until the maximum flow of gas through each of the outlets 104 is achieved without the withdrawal of entrained oil or foam. As will be understood, a very small quantity of gas is withdrawn through the first of the outlets 104 with a larger quantity being withdrawn from each of the succeeding outlets 104. The removal of quantities of separated gas by way of the outlets 104 serves to reduce the gas separation load on the apparatus 10.

The major portion of the separated gas which is not discharged through the gas outlets 104 flows through the top portions of the foam breaking pads 60 to the rearward portion of the compartment 17. The gas then passes by way of the conduit 78 from the top portion of the compartment 17 into the compartment 80. The gas is discharged through the end 82 of the conduit 78 within the compartment 80 causing it to swirl and centrifugal force to be imparted thereto. The centrifugal force imparted to the gas stream causes any entrained oil and foam remaining therein to move to the walls of the compartment 80 and accumulate in the bottom portion thereof by gravity. The level control valve 98 and liquid level controller 102 function to maintain a body of oil 99 in the bottom portion of the compartment 80. The splash plate 84 prevents disturbance of the body of oil 99 by the swirling gas, and causes the gas to move upwardly through the center portion of the compartment 80. The separated gas which may still contain a mist of entrained oil passes through the mist extractor 90 disposed in the compartment 80 wherein the mist of entrained oil is removed from the gas. The resulting oil and foam free gas passes through the outlet 88 from the compartment 80 into the gas outlet header 108 by way of the conduit 112.

The horizontal plates 70 disposed within the compartment 17 function to provide surface area for the agglomeration of oil carried with gas rising up from the body of oil contained in the bottom portion of the compartment 17 and passing into the conduit 78.

Because of the provision of the closed compartment 80 which functions to bring about the separation of mist and entrained oil from the major portion of the gas stream separated from the oil and foam, the level of the body of oil and foam contained in the bottom portion of the compartment may be maintained at a relatively high point within the compartment 17 as compared to heretofore used apparatus. That is, a major portion of the space within the compartment 17 of the vessel 12 may be utilized for breaking oil foam with only a minor free space above the level of the body of oil 61 and foam layer 63 allowed for gas separation. This more efficient utilization of the space within the vessel 12 for breaking foam brings about an increased capacity for separating oil and gas from the foamy crude oil inlet stream by the apparatus 10 as compared to heretofore used apparatus.

In order to further illustrate the operation of the apparatus 10, the following example is given:

EXAMPLE

A 1,350,000 lb/hr foaming crude oil stream at a pressure of 450 psia and a temperature of 160° F is passed by way of the inlet connection 18 into the first compartment 17 of the vessel 12. The vessel 12 is of a 96 inch diameter × 40 foot long overall size. The inlet crude oil stream is comprised of 65 weight percent free oil, 20 weight percent foam and 15 weight percent free gas.

4,000 lb/hr of gas free of entrained oil and foam is withdrawn from the compartment 17 by way of the first gas outlet 104. 8,000 lb/hr of gas is withdrawn from the second gas outlet 104, 12,000 lb/hr from the third gas outlet 104, 20,000 lb/hr from the fourth gas outlet 104, and 36,000 lb/hr from the last gas outlet 104. 120,000 lb/hr of gas free of entrained oil is withdrawn from the compartment 80 by way of the gas outlet 88 making a total outlet gas stream passing from the apparatus 10 by way of the gas outlet header 108 of 200,000 lb/hr.

1,000,000 lb/hr of foam free oil is withdrawn from the first compartment 17 of the vessel 12 by way of oil outlet 66 and 150,000 lb/hr of foam free oil is withdrawn from the bottom portion of the compartment 80 by way of oil outlet 86 making a total of 1,150,000 lb/hr of foam free oil withdrawn by way of the conduit 92 from the apparatus 10. The manufactured cost of the apparatus 10 is 50,000 United States Dollars, and the ratio of foaming crude oil capacity to the cost of the apparatus 10 is 1.7 bbls per day per Dollar.

The above is compared with a typical conventional separator apparatus of the same size as the apparatus 10 which includes conventional internal foam breaking and gas separating devices. The maximum quantity of the above-described foaming crude oil stream that can be handled by such a conventional separator is 810,000 lb/hr, and the manufactured cost of the separator is 45,000 United States Dollars. Thus, the ratio of foaming crude oil capacity to cost of the conventional apparatus is 1.3 bbls per day per Dollar.

Thus, the present invention is well adapted to carry out the objects and attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. Apparatus for separating oil and gas from a foaming crude oil stream which comprises:

an elongate horizontal vessel having closed first and second compartments therein;

a crude oil stream inlet into said first compartment of said vessel;

a coalescing section comprised of a plurality of smooth cylindrical plates positioned longitudinally and concentrically to provide annular flow passages therebetween, said plates being disposed within said first compartment across the interior thereof so that gas and foam from said crude oil stream pass through said annular flow passages and oil carried with said gas is coalesced and agglomerated on said plates and removed from said gas;

a plurality of foam breaking pads disposed in said first compartment positioned in spaced relationship across the interior thereof on the side of said coalescing section away from said crude oil stream inlet, each of said foam breaking pads including knitted mesh having a texture to distort and break foam thereby releasing gas held in said foam;

an oil outlet from said first compartment positioned on the side of the last of said foam breaking pads away from said crude oil stream inlet;

a passageway communicating the top portion of said first compartment on the side of the last of said foam breaking pads away from said crude oil stream inlet with said second compartment so that separated gas and gas released from said foam in said first compartment is passed into said second compartment;

a gas outlet from said second compartment;

a mist extractor pad positioned across said second compartment between said passageway and said gas outlet so that oil mist entrained in said gas passing through said second compartment is removed therefrom and accumulated in said second compartment; and an oil outlet from said second compartment.

2. The apparatus of claim 1 which is further characterized to include a centrifugal separator disposed within said first compartment and connected to said crude oil stream inlet for initially separating gas from oil and foam contained in said crude oil stream.

3. The apparatus of claim 2 wherein said second compartment within said vessel is substantially spherical in internal shape and said passageway communicating said first compartment with said second compartment comprises a conduit extending from within the upper portion of said first compartment into said second compartment, said conduit opening within said second compartment horizontally and tangentially to an internal surface thereof so that centrifugal force is imparted to said gas as it passes through said second compartment thereby promoting the separation of entrained oil from said gas.

4. The apparatus of claim 3 which is further characterized to include:
a plurality of gas outlets from said first compartment, the first of said outlets being located between said coalescing section and said plurality of foam breaking pads, other of said outlets being located between each of said foam breaking pads, and the last of said outlets being located on the side of the last of said foam breaking pads away from said crude oil stream inlet;
a gas outlet header;
a plurality of conduits connecting said gas outlet header to said plurality of gas outlets;
means for controlling the flow of gas passing from each of said outlets into said header disposed in each of said conduits; and
a conduit connecting said gas outlet from said second compartment to said gas outlet header.

5. In an apparatus for separating oil and gas from a foaming crude oil stream of the type including an elongate substantially horizontal vessel having a crude oil stream inlet at one end and oil and gas outlets at points removed from the inlet, the improved combination with said vessel comprising:
a coalescing section comprised of a plurality of smooth cylindrical plates positioned longitudinally and concentrically to provide annular flow passages therebetween disposed within said vessel across the interior thereof and adjacent to said crude oil stream inlet so that gas and foam from said crude oil stream pass through said annular passages and oil carried with said gas is coalesced and agglomerated on said plates and removed therefrom;
a plurality of foam breaking pads disposed in said vessel positioned in spaced relationship across the interior thereof on the side of said coalescing section away from said crude oil stream inlet, each of said foam breaking pads including knitted mesh having a texture to distort and break foam thereby releasing the gas held in said foam;
an oil outlet from said vessel positioned on the side of the last of said foam breaking pads away from said crude oil stream inlet;
a closed compartment disposed within said vessel at the end thereof away from said crude oil stream inlet;
a passageway communicating the top portion of said vessel with said closed compartment so that separated gas and gas released from said foam in said vessel is passed into said closed compartment;
a gas outlet from said closed compartment;
a mist extractor pad positioned across said closed compartment between said passageway and said gas outlet so that oil mist entrained in said gas passing through said compartment is removed therefrom; and
an oil outlet from said compartment.

6. The apparatus of claim 5 which is further characterized to include a centrifugal separator disposed within said first compartment between said crude oil stream inlet and said coalescing section, said centrifugal separator being connected to said crude oil stream inlet so that gas is initially separated from oil and foam contained in said crude oil stream as said crude oil stream passes through said separator.

7. The apparatus of claim 6 wherein said closed compartment within said vessel is substantially spherical in internal shape and said passageway communicating the upper portion of said vessel with said closed compartment comprises a conduit extending from the upper portion of said vessel into said closed compartment, said conduit opening within said closed compartment horizontally and tangentially to an internal surface thereof so that centrifugal force is imparted to said gas as it passes through said closed compartment thereby promoting the separation of entrained liquids therefrom.

8. The apparatus of claim 7 which is further characterized to include:
a plurality of gas outlets from said vessel, the first of said outlets being located between said coalescing section and said plurality of foam breaking pads, other of said outlets being located between each of said foam breaking pads and the last of said outlets being located on the side of the last of said foam breaking pads away from said crude oil stream inlet;
a gas outlet header;
a plurality of conduits connecting said gas outlet header to said plurality of gas outlets;
means for controlling the flow of gas passing from each of said gas outlets to said gas outlet header disposed in each of said conduits; and
a conduit connecting the gas outlet from said closed compartment to said gas outlet header.

* * * * *